United States Patent
Murofushi et al.

(10) Patent No.: US 11,900,203 B2
(45) Date of Patent: Feb. 13, 2024

(54) WIRELESS TAG READING APPARATUS AND METHOD

(71) Applicant: TOSHIBA TEC KABUSHIKI KAISHA, Tokyo (JP)

(72) Inventors: Nobuo Murofushi, Susono Shizuoka (JP); Wataru Sakurai, Izu Shizuoka (JP); Shigeaki Suzuki, Gotemba Shizuoka (JP); Yuki Suzuki, Izunokuni Shizuoka (JP); Masaki Kimura, Izunokuni Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 35 days.

(21) Appl. No.: 17/553,248

(22) Filed: Dec. 16, 2021

(65) Prior Publication Data
US 2022/0309260 A1  Sep. 29, 2022

(30) Foreign Application Priority Data
Mar. 24, 2021 (JP) ................................. 2021-049830

(51) Int. Cl.
G06K 7/10 (2006.01)
(52) U.S. Cl.
CPC ..... *G06K 7/10207* (2013.01); *G06K 7/10316* (2013.01); *G06K 7/10366* (2013.01)

(58) Field of Classification Search
CPC .......... G06K 7/10207; G06K 7/10316; G06K 7/10366
See application file for complete search history.

(56) References Cited

U.S. PATENT DOCUMENTS

2008/0122581 A1* 5/2008 Bae ...................... G06K 7/0008
340/10.2

FOREIGN PATENT DOCUMENTS

JP  2011-008616 A  1/2011

* cited by examiner

*Primary Examiner* — Jamara A Franklin
(74) *Attorney, Agent, or Firm* — FOLEY & LARDNER LLP

(57) ABSTRACT

According to one embodiment, a wireless tag reading apparatus includes a first communication interface configured to communicate with a first external device, a second communication interface configured to communicate with a second external device, an antenna configured to emit a radio wave to read a wireless tag, and a controller. The controller is configured to identify either (a) the first communication interface as being in communication with the first external device or (b) the second communication interface as being in communication with the second external device. The controller is configured to change a power level of the radio wave emitted by the antenna based on which of the first communication interface or the second communication interface is identified. The controller is configured to read the wireless tag by controlling the antenna to emit the radio wave with the changed power level.

19 Claims, 3 Drawing Sheets

WIRELESS TAG READING APPARATUS AND METHOD

CROSS-REFERENCE TO RELATED APPLICATION

This application is based upon and claims the benefit of priority from Japanese Patent Application No. 2021-049830, filed on Mar. 24, 2021, the entire contents of which are incorporated herein by reference.

FIELD

Embodiments described herein relate generally to a wireless tag reading apparatus and a method.

BACKGROUND

In the related art, a wireless tag reading apparatus that reads identification information from a wireless tag is known. Such a wireless tag reading apparatus is used for a commodity registration process of reading identification information of a commodity to register a commodity for sale or is used for an inventory management process of reading identification information of an article to manage inventory from a warehouse.

This way, in the wireless tag reading apparatus, a reading range of a wireless tag is specified depending on the purpose of use. Therefore, an operator needs to manually change the reading range of the wireless tag depending on the purpose of use. However, the operator may forget the setting of the reading range or may mistake the setting of the reading range.

DETAILED DESCRIPTION

The problem to be solved by exemplary embodiments described herein is to provide a wireless tag reading apparatus and a method in which the possibility of reading a wireless tag in an erroneous reading range can be reduced.

In general, according to one embodiment, a wireless tag reading apparatus includes a first communication interface configured to communicate with a first external device, a second communication interface configured to communicate with a second external device, an antenna configured to emit a radio wave to read a wireless tag, and a controller. The controller is configured to identify either (a) the first communication interface as being in communication with the first external device or (b) the second communication interface being in communication with the second external device. The controller is configured to change power level of the radio wave emitted by the antenna based on which of the first communication interface or the second communication interface is identified. The controller is configured to read the wireless tag by controlling the antenna to emit the radio wave with the changed power level.

Hereinafter, an embodiment of a wireless tag reading apparatus and a method will be described in detail with reference to the accompanying drawings. The embodiment described below is an embodiment of the wireless tag reading apparatus and the method, and a configuration, a specification, or the like thereof is not limited.

Figure 1:
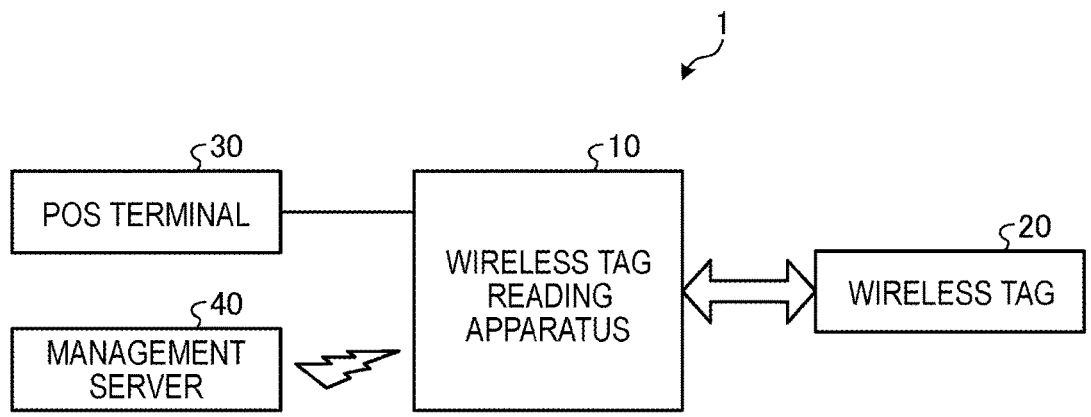
FIG. 1 is a diagram illustrating an example of a reading system according to an embodiment.

FIG. 1 is a diagram illustrating an example of a reading system 1 according to the embodiment. The reading system 1 includes a wireless tag reading apparatus 10 (e.g., a wireless tag reader), a wireless tag 20, a point of sale (POS) terminal 30, and a management server 40. The wireless tag reading apparatus 10 is exclusively connected to any one of the POS terminal 30 or the management server 40. The POS terminal 30 and the management server 40 are each examples of an external apparatus (e.g., an external device) connected to the wireless tag reading apparatus 10.

The wireless tag 20 is, for example, a tag such as an electronic tag, an IC tag, or an RF tag. The wireless tag 20 transmits and receives information stored in a storage medium (e.g., a memory) of the wireless tag 20 by near field communication. For example, the wireless tag 20 stores identification information in the storage medium. The identification information is information for identifying an article to which the wireless tag 20 is attached.

The wireless tag reading apparatus 10 is a reading apparatus that reads the storage medium of the wireless tag 20. More specifically, the wireless tag reading apparatus 10 emits a radio wave for reading the identification information stored in the storage medium of the wireless tag 20. If the radio wave is transmitted from the wireless tag 20, the wireless tag reading apparatus 10 extracts the identification information by demodulating the radio wave received from the wireless tag 20.

In addition, the wireless tag reading apparatus 10 is connected to any one of the POS terminal 30 or the management server 40. For example, the wireless tag reading apparatus 10 is connected to the POS terminal 30 by wired connection, for example, through a universal serial bus (USB) cable or a local area network (LAN) cable. In addition, the wireless tag reading apparatus 10 is connected to the management server 40 by wireless connection, for example, through Bluetooth (registered trademark) or a wireless LAN. The wireless tag reading apparatus 10 changes power of a radio wave used for reading the wireless tag 20 depending on a destination to which the POS terminal 30 or the management server 40 is connected.

The POS terminal 30 is sales data processing apparatus that executes a commodity registration process of registering a commodity for sale and a payment process of settling a price of a commodity to be registered through the commodity registration process. The POS terminal 30 registers, as a commodity for sale, the commodity that is specified by the identification information read by the wireless tag reading apparatus 10. Here, it is necessary to prevent the wireless tag reading apparatus 10 from reading another wireless tag 20 that is attached to a commodity other than the commodity for sale in the commodity registration process (e.g., it is desirable to prevent a situation in which the user intends to read a wireless tag 20 associated with a first commodity, but the wireless tag reading apparatus 10 reads a wireless tag 20 associated with another commodity nearby). Therefore, the wireless tag reading apparatus 10 sets a narrow range as a reading area. For example, the wireless tag reading apparatus 10 sets, as the reading area, a range of several tens of centimeters from an antenna 107 (refer to FIG. 2) of the wireless tag reading apparatus 10.

The management server 40 is a server apparatus that executes inventory management or the like. The management server 40 records an article stored in a warehouse or the like by the identification information read by the wireless tag reading apparatus 10. Here, in the inventory management or the like, the wireless tag reading apparatus 10 can complete reading the entire warehouse within a short period of time by reading the wireless tags 20 at one time to read a wide range. Therefore, the wireless tag reading apparatus 10 sets a wide range as a reading area. For example, the wireless tag reading apparatus 10 sets, as the reading area, a range of several meters from an antenna 107 (refer to FIG. 2) of the wireless tag reading apparatus 10.

This way, the wireless tag reading apparatus 10 sets a narrow range as the reading range when being connected to the POS terminal 30 by wired connection, and sets a wide range as the reading area when being connected to the management server 40 by wireless connection. Therefore, the wireless tag reading apparatus 10 changes the width of the reading range depending on the method of connection to an external apparatus such as the POS terminal 30 or the management server 40.

Next, a hardware configuration of the wireless tag reading apparatus 10 will be described.

Figure 2:
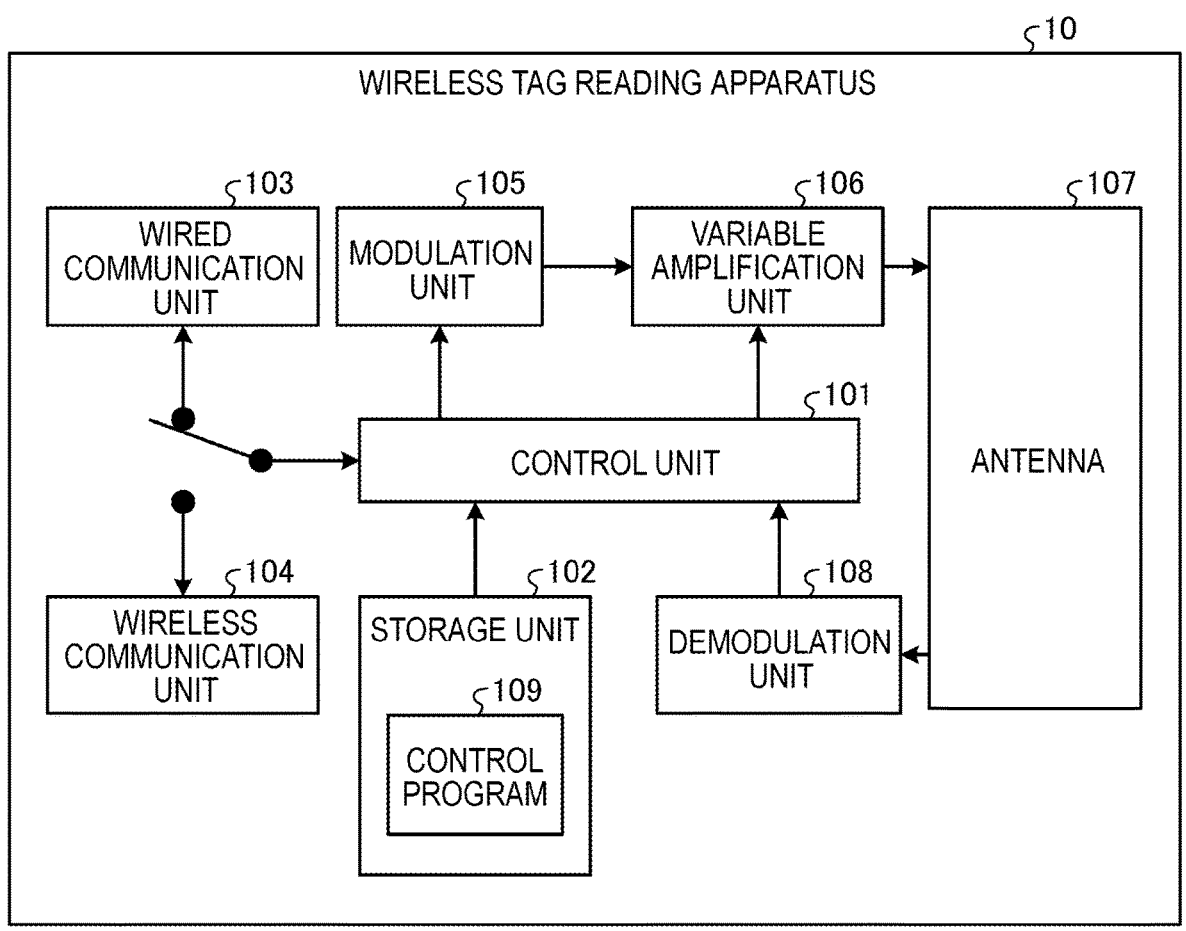
FIG. 2 is a block diagram illustrating an example of a hardware configuration of a wireless tag reading apparatus.

FIG. 2 is a block diagram illustrating an example of the hardware configuration of the wireless tag reading apparatus 10 according to the embodiment. The wireless tag reading apparatus 10 includes a control unit 101 (e.g., a controller), a storage unit 102 (e.g., a memory), a wired communication unit 103 (e.g., a wired communication interface), a wireless communication unit 104 (e.g., a wireless communication interface), a modulation unit 105 (e.g., a modulator), a variable amplification unit 106 (e.g., an amplifier), an antenna 107, and a demodulation unit 108 (e.g., a demodulator).

The control unit 101 is a computer that controls an overall operation of the wireless tag reading apparatus 10 and realizes various functions in the wireless tag reading apparatus 10. The control unit 101 includes a central processing unit (CPU) (e.g., one or more processors), a read only memory (ROM) (e.g., one or more memories or memory devices), and a random access memory (RAM). The CPU integrally controls an operation of the wireless tag reading apparatus 10. The ROM is a storage medium that stores various programs or data. The RAM is a storage medium that temporarily stores various programs or various data. The CPU executes a program stored in the ROM, the storage unit 102, or the like by using the RAM as a work area.

The storage unit 102 is a storage device (e.g., a single storage device, multiple storage devices acting in combination) such as a flash memory. The storage unit 102 stores a control program 109. The control program 109 is a program for causing an operating system or a function in the wireless tag reading apparatus 10 to be implemented. The control program 109 includes a program that causes characteristic functions according to the embodiment to be implemented.

The wireless tag reading apparatus 10 does not need to include the storage unit 102. In this case, the control program 109 is stored in the ROM of the control unit 101. In addition, the RAM of the control unit 101 includes a battery for storing information. The RAM of the control unit 101 stores various settings and information.

The wired communication unit 103 is a communication unit that communicates with an external apparatus by wired connection. More specifically, the wired communication unit 103 communicates with the POS terminal 30. For example, the wired communication unit 103 is an apparatus such as a USB controller or a network card.

The wireless communication unit 104 is a communication unit that communicates with an external apparatus by wireless connection. More specifically, the wireless communication unit 104 communicates with, for example, the management server 40. For example, the wireless communication unit 104 is an apparatus such as a Bluetooth (registered trademark) adapter or a wireless LAN card.

The modulation unit 105 modulates information output from the control unit 101 and outputs a high-frequency signal. If information is not output from the control unit 101, the modulation unit 105 outputs only a carrier wave in some cases.

The variable amplification unit 106 amplifies and outputs the high-frequency signal input from the modulation unit 105. The variable amplification unit 106 is controlled by the control unit 101 to change an amplification factor of the high-frequency signal. As a result, the variable amplification unit 106 changes power used for outputting the high-frequency signal. That is, the variable amplification unit 106 changes a field intensity of a radio wave emitted from the antenna 107.

The antenna 107 emits the high-frequency signal output from the variable amplification unit 106 to a space as the radio wave. In addition, the antenna 107 converts the radio wave acquired from the space into a high-frequency signal. The antenna 107 outputs the high-frequency signal to the demodulation unit 108. The antenna 107 has characteristics in which a radio wave is emitted strongly in a specific direction (e.g., the antenna may be a directional antenna). For example, the antenna 107 is a planar patch antenna.

The demodulation unit 108 demodulates the high-frequency signal output from the antenna 107. As a result, the demodulation unit 108 extracts information received from the wireless tag 20. The demodulation unit 108 outputs the extracted information to the control unit 101.

Figure 3:
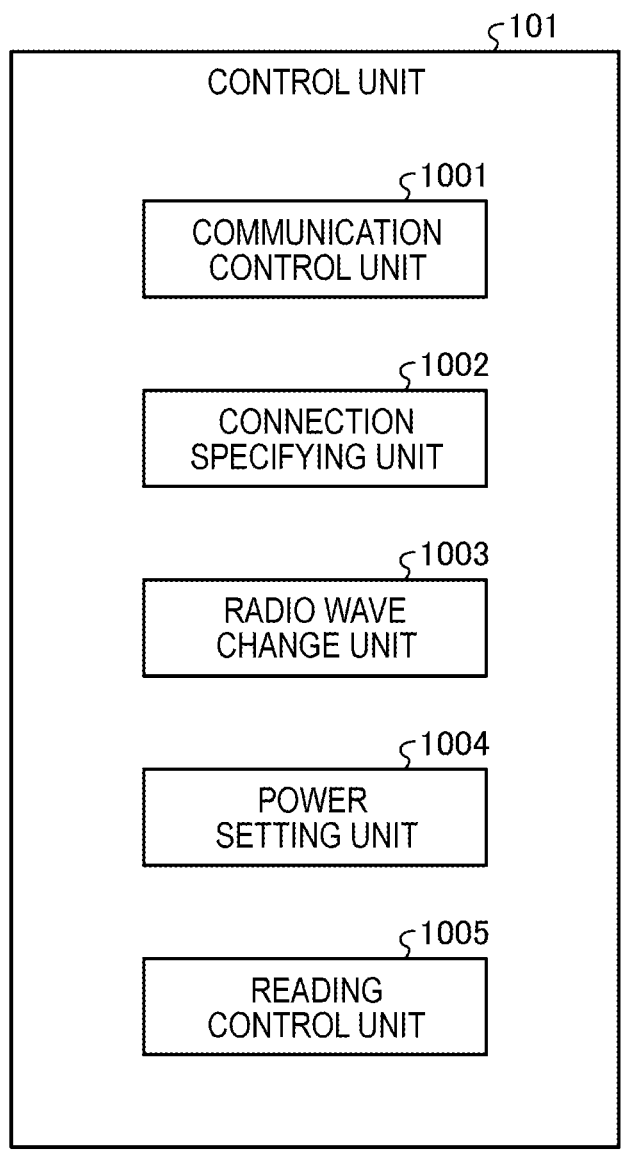
FIG. 3 is a block diagram illustrating an example of a functional configuration.

Next, the functions of the wireless tag reading apparatus 10 will be described. FIG. 3 is a block diagram illustrating an example of a functional configuration in the wireless tag reading apparatus 10 according to the embodiment.

The control unit 101 of the wireless tag reading apparatus 10 generates each functional unit in the RAM by loading the control program 109 stored in the storage unit 102 in the RAM and operating according to the control program 109. As a result, the control unit 101 of the wireless tag reading apparatus 10 includes, as the functional units, a communication control unit 1001, a connection specifying unit 1002, a radio wave change unit 1003, a power setting unit 1004, and a reading control unit 1005.

The communication control unit 1001 controls the wired communication unit 103 or the wireless communication unit 104 to communicate with an external apparatus. Here, the wireless tag reading apparatus 10 cannot be connected to a plurality of external apparatuses at the same time. The communication control unit 1001 communicates with an external apparatus by controlling a communication unit that establishes communication among the wired communication unit 103 and the wireless communication unit 104.

If communication between the POS terminal 30 and the wired communication unit 103 is established, the communication control unit 1001 connects the wired communication unit 103 and the POS terminal 30 to each other. The communication control unit 1001 controls the wired communication unit 103 to communicate with the POS terminal 30. The communication control unit 1001 may disable the wireless communication unit 104 while the wired communication unit 103 communicates with the POS terminal 30. On the other hand, if communication between the management server 40 and the wireless communication unit 104 is established, the communication control unit 1001 connects the wireless communication unit 104 and the management server 40 to each other. The communication control unit 1001 controls the wireless communication unit 104 to communicate with the management server 40. The communication control unit 1001 may disable the wired communication unit 103 while the wireless communication unit 104 communicates with the management server 40.

The connection specifying unit 1002 specifies (e.g., identifies) the communication unit connected to an external apparatus among a plurality of communication units. The connection specifying unit 1002 is an example of the specifying unit. The wired communication unit 103 and the wireless communication unit 104 are examples of the communication unit. The POS terminal 30 and the management server 40 are examples of the external apparatus. That is, the connection specifying unit 1002 specifies the communication unit connected to the external apparatus among the wired communication unit 103 connected by wired connection and the wireless communication unit 104 connected by wireless connection.

For example, if the wired communication unit 103 and the POS terminal 30 are connected to each other, the connection specifying unit 1002 specifies the wired communication unit 103 connected by wired connection as the communication unit connected to the external apparatus. In addition, if the wireless communication unit 104 and the management server 40 are connected to each other, the connection specifying unit 1002 specifies the wireless communication unit 104 connected by wireless connection as the communication unit connected to the external apparatus.

The radio wave change unit 1003 changes (e.g., varies, determines, sets, etc.) a power (e.g., a power level) of a radio wave used for reading the wireless tag 20 depending on the communication unit specified by the connection specifying unit 1002. The radio wave change unit 1003 is an example of the change unit. That is, the radio wave change unit 1003 changes a reading range where the wireless tag 20 is read by changing the setting of the power of the radio wave based on the specification result of the connection specifying unit 1002.

Here, examples of the setting of the power of the radio wave include a high power setting and a low power setting. The high power setting is a setting where a radio wave is emitted with high power. That is, the high power setting is a setting where a wide range is set as the reading range. The low power setting is a setting where a radio wave is emitted with low power. That is, the low power setting is a setting where a narrow range is set as the reading range.

If the wired communication unit 103 connected by wired connection is specified by the connection specifying unit 1002, the radio wave change unit 1003 reduces the power of the radio wave used for reading the wireless tag 20. In other words, the radio wave change unit 1003 reduces the intensity of the radio wave used for reading the wireless tag 20 to narrow the reading range.

If the wireless communication unit 104 connected by wireless connection is specified by the connection specifying unit 1002, the radio wave change unit 1003 increases the power of the radio wave used for reading the wireless tag 20. In other words, the radio wave change unit 1003 increases the intensity of the radio wave used for reading the wireless tag 20 to widen the reading range.

The power setting unit 1004 sets the power of the radio wave used for reading the wireless tag 20 for each communication unit. The power setting unit 1004 is an example of the setting unit. More specifically, if the POS terminal 30 and the wired communication unit 103 are connected to each other, the power setting unit 1004 sets the power of the radio wave used for reading the wireless tag 20. In addition, if the management server 40 and the wireless communication unit 104 are connected to each other, the power setting unit 1004 sets the power of the radio wave used for reading the wireless tag 20. As a result, the radio wave change unit 1003 changes the power set by the power setting unit 1004 depending on the communication unit specified by the connection specifying unit 1002.

The reading control unit 1005 reads the wireless tag 20 by emitting the radio wave used for reading the wireless tag 20 with the power changed by the radio wave change unit 1003. The reading control unit 1005 is an example of the reading unit. That is, the reading control unit 1005 emits the radio wave used for reading the wireless tag 20 with the power corresponding to the setting of the power of the radio wave. More specifically, if the setting of the power of the radio wave is the high power setting, the reading control unit 1005 emits the radio wave used for reading the wireless tag 20 with high power. In addition, if the setting of the power of the radio wave is the low power setting, the reading control unit 1005 emits the radio wave used for reading the wireless tag 20 with low power.

In addition, the reading control unit 1005 acquires information received from the wireless tag 20 and extracted by demodulating the high-frequency signal output from the antenna 107 by the demodulation unit 108. The reading control unit 1005 outputs the information received from the wireless tag 20 to the communication unit specified by the connection specifying unit 1002.

If the POS terminal 30 is connected to the wired communication unit 103, the reading control unit 1005 outputs the information received from the wireless tag 20 to the wired communication unit 103. As a result, the wired communication unit 103 outputs the information received from the wireless tag 20 to the POS terminal 30. On the other hand, if the management server 40 is connected to the wireless communication unit 104, the reading control unit 1005 outputs the information received from the wireless tag 20 to the wireless communication unit 104. As a result, the wireless communication unit 104 outputs the information received from the wireless tag 20 to the management server 40.

Figure 4:
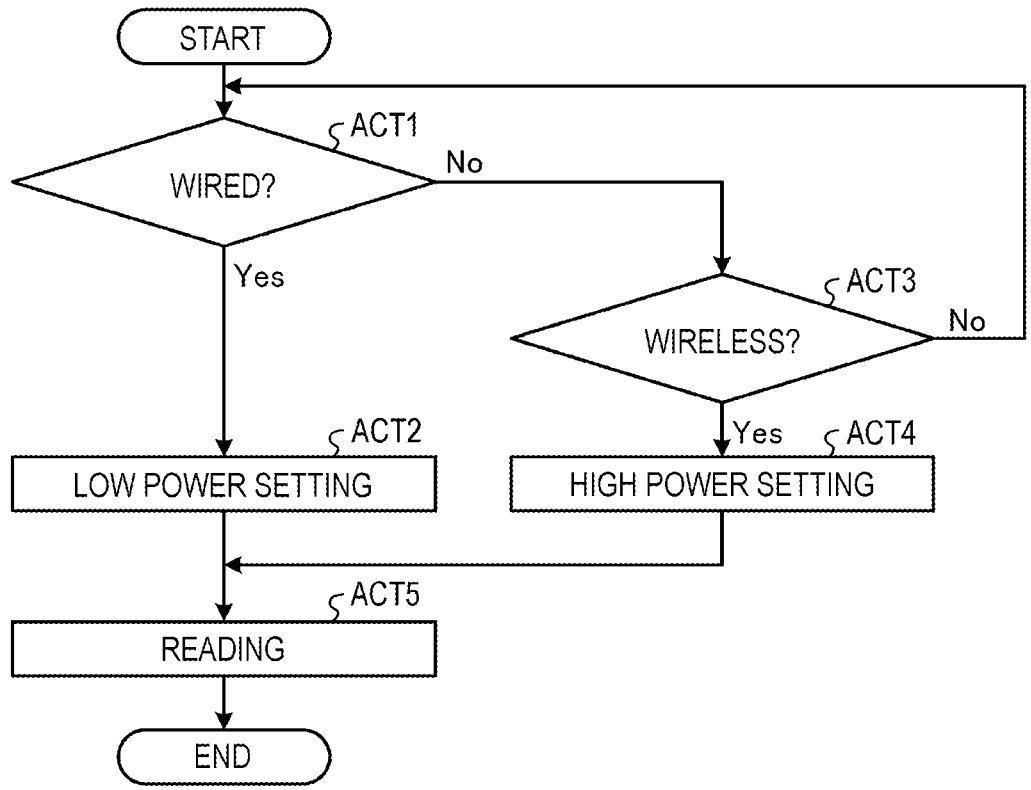
FIG. 4 is a flowchart illustrating an example of a reading process that is executed.

Next, a reading process that is executed by the wireless tag reading apparatus 10 will be described. Here, FIG. 4 is a flowchart illustrating an example of the reading process that is executed by the wireless tag reading apparatus 10 according to the embodiment.

The connection specifying unit 1002 determines whether or not the POS terminal 30 is connected to the wired communication unit 103 (ACT 1). If the POS terminal 30 is connected to the wired communication unit 103 (ACT 1; Yes), the radio wave change unit 1003 sets the setting of the power of the radio wave used for reading the wireless tag 20 to the low power setting (ACT 2).

If the POS terminal 30 is not connected to the wired communication unit 103 (ACT 1; No), the connection specifying unit 1002 determines whether or not the management server 40 is connected to the wireless communication unit 104 (ACT 3). If the management server 40 is not connected to the wireless communication unit 104 (ACT 3; No), the wireless tag reading apparatus 10 proceeds to ACT 1.

If the management server 40 is connected to the wireless communication unit 104 (ACT 3; Yes), the radio wave change unit 1003 sets the setting of the power of the radio wave used for reading the wireless tag 20 to the high power setting (ACT 4).

The reading control unit 1005 reads the wireless tag 20 by emitting the radio wave used for reading the wireless tag 20 with the power changed by the radio wave change unit 1003 (ACT 5). That is, the reading control unit 1005 reads the wireless tag 20 by emitting the radio wave based on the setting in ACT 2 or ACT 4.

As a result, the wireless tag reading apparatus 10 ends the reading process.

As described above, the wireless tag reading apparatus 10 according to the embodiment specifies the communication unit connected to the external apparatus among a plurality of communication units such as the wired communication unit 103 or the wireless communication unit 104. In addition, the wireless tag reading apparatus 10 changes the power of the radio wave used for reading the wireless tag 20 depending on the specified communication unit. The wireless tag reading apparatus 10 reads the wireless tag 20 by emitting the radio wave used for reading the wireless tag 20 with the changed power. As a result, the wireless tag reading apparatus 10 changes the reading range depending on the purpose of use of the connection destination. Accordingly, the wireless tag reading apparatus 10 can reduce the possibility of reading the wireless tag 20 in an erroneous reading range.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

Modification Example 1

If the external apparatus such as the POS terminal 30 is connected to the wired communication unit 103, the wireless tag reading apparatus 10 according to the embodiment sets the setting of the power of the radio wave used for reading the wireless tag 20 to the low power setting. On the other hand, if the external apparatus such as the management server 40 is connected to the wireless communication unit 104, the wireless tag reading apparatus 10 sets the setting of the power of the radio wave used for reading the wireless tag 20 to the high power setting.

However, the high power setting and the low power setting may be interchangeable. If the external apparatus such as the POS terminal 30 is connected to the wired communication unit 103, the wireless tag reading apparatus 10 according to Modification Example 1 of the embodiment sets the setting of the power of the radio wave used for reading the wireless tag 20 to the high power setting. On the other hand, if the external apparatus such as the management server 40 is connected to the wireless communication unit 104, the wireless tag reading apparatus 10 sets the setting of the power of the radio wave used for reading the wireless tag 20 to the low power setting.

For example, in a collection operation of collecting commodities designated in a warehouse or the like, the wireless tag reading apparatus 10 is connected to a tablet terminal by near field communication or the like. The wireless tag reading apparatus 10 reads the wireless tag 20 attached to a commodity that is taken out from a shelf by a user. The tablet terminal displays information that is read from the wireless tag 20 by the wireless tag reading apparatus 10. Here, on the shelf of the warehouse, a plurality of commodities to which the wireless tag 20 is attached are present. Therefore, in the collection operation, in order to inhibit the wireless tags 20 attached to the commodities on the shelf from being read, the wireless tag reading apparatus 10 reduces the power of the radio wave used for reading the wireless tag 20 to narrow the reading range.

In an inspection operation of checking whether or not commodities put into a container to store the commodities in a warehouse are deficient or excessive, the wireless tag reading apparatus 10 is connected to a personal computer by wired connection. The wireless tag reading apparatus 10 reads the wireless tag 20 attached to a commodity that is taken out from a shelf by a user. The personal computer displays a comparison result between information that is read from the wireless tag 20 by the wireless tag reading apparatus 10 and a list of the commodities that are scheduled to be stocked in the warehouse. Here, the container has a size where a large number of commodities can be stored. Therefore, in the inspection operation, in order to read the wireless tags 20 attached to a large number of commodities in the container at one time, the wireless tag reading apparatus 10 increases the power of the radio wave used for reading the wireless tag 20 to widen the reading range.

This way, if the external apparatus is connected to the wired communication unit 103, whether to increase or to reduce the power of the radio wave used for reading the wireless tag 20 is determined depending on the use of the wireless tag reading apparatus 10. Likewise, the external apparatus is connected to the wireless communication unit 104, whether to increase or to reduce the power of the radio wave used for reading the wireless tag 20 is determined depending on the use of the wireless tag reading apparatus 10. This way, if the external apparatus is connected to the wired communication unit 103 or the wireless communication unit 104, whether to increase or to reduce the power of the radio wave used for reading the wireless tag 20 is freely changed.

Here, the power setting unit 1004 sets the power of the radio wave used for reading the wireless tag 20 for each communication unit such as the wired communication unit 103 or the wireless communication unit 104. As a result, a user can allow the power setting unit 1004 to set the power of the radio wave used for reading the wireless tag 20 depending on the use of the wireless tag reading apparatus 10.

Figure 5:
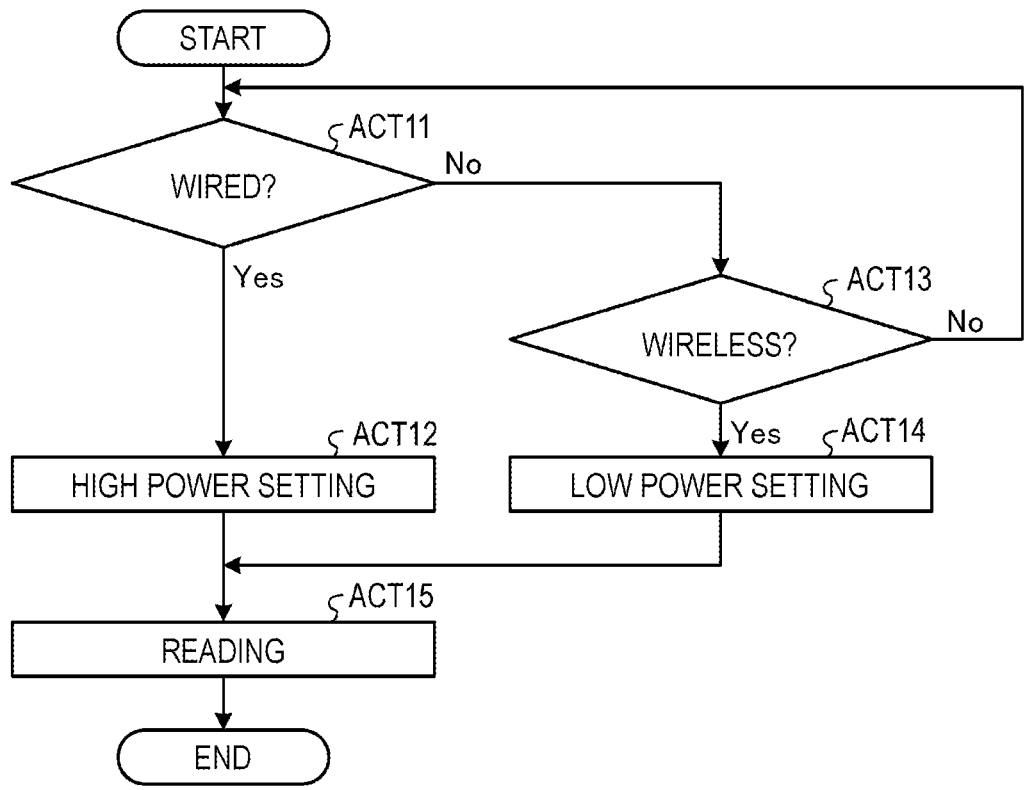
FIG. 5 is a flowchart illustrating an example of a reading process that is executed by the wireless tag reading apparatus according to Modification Example 1.

Next, the reading process that is executed by the wireless tag reading apparatus 10 according to Modification Example 1 will be described. Here, FIG. 5 is a flowchart illustrating an example of the reading process that is executed by the wireless tag reading apparatus 10 according to Modification Example 1.

The connection specifying unit 1002 determines whether or not the personal computer is connected to the wired communication unit 103 (ACT 11). If the personal computer is connected to the wired communication unit 103 (ACT 11; Yes), the radio wave change unit 1003 sets the setting of the power of the radio wave used for reading the wireless tag 20 to the high power setting (ACT 12).

If the personal computer is not connected to the wired communication unit 103 (ACT 11; No), the connection specifying unit 1002 determines whether or not the tablet terminal is connected to the wireless communication unit 104 (ACT 13). If the tablet terminal is not connected to the wireless communication unit 104 (ACT 13; No), the wireless tag reading apparatus 10 proceeds to ACT 11.

If the tablet terminal is connected to the wireless communication unit 104 (ACT 13; Yes), the radio wave change unit 1003 sets the setting of the power of the radio wave used for reading the wireless tag 20 to the low power setting (ACT 14).

The reading control unit 1005 reads the wireless tag 20 by emitting the radio wave used for reading the wireless tag 20 with the power changed by the radio wave change unit 1003 (ACT 15). That is, the reading control unit 1005 reads the wireless tag 20 by emitting the radio wave based on the setting in ACT 12 or ACT 14.

As a result, the wireless tag reading apparatus 10 ends the reading process.

As described above, if the personal computer is connected to the wired communication unit 103, the wireless tag reading apparatus 10 according to Modification example 1 sets the setting of the power of the radio wave used for reading the wireless tag 20 to the high power setting. On the other hand, if the tablet terminal is connected to the wireless communication unit 104, the wireless tag reading apparatus 10 sets the setting of the power of the radio wave used for reading the wireless tag 20 to the low power setting. The wireless tag reading apparatus 10 reads the wireless tag 20 by emitting the radio wave used for reading the wireless tag 20 with the changed power. As a result, the wireless tag reading apparatus 10 changes the reading range depending on the purpose of use of the connection destination. Accordingly, in Modification Example 1, the wireless tag reading apparatus 10 can reduce the possibility of reading the wireless tag 20 in an erroneous reading range.

In addition, the wireless tag reading apparatus 10 according to the embodiment includes two communication units including the wired communication unit 103 and the wireless communication unit 104. However, the wireless tag reading apparatus 10 may include three or more communication units.

In addition, the wireless tag reading apparatus 10 according to the embodiment classifies the communication units into the wired communication unit 103 connected by wired connection and the wireless communication unit 104 connected by the wireless communication, and the communication method of each communication unit may be any method. For example, the wireless tag reading apparatus 10 may include: a first communication unit that has an interface connected via a USB; and a second communication unit that has an interface connected via a wired LAN. In this case, the wireless tag reading apparatus 10 may change the power of the radio wave used for reading the wireless tag 20 depending on whether the external apparatus is connected to the first communication unit or the second communication unit. Further, the wireless tag reading apparatus 10 is not limited to adopting a wired connection method and may include a communication unit for each wireless connection method. Alternatively, the wireless tag reading apparatus 10 may adopt a wired connection method and a wireless connection method in combination.

A program that is executed by each apparatus according to the embodiment and the modification examples is embedded in a storage medium (for example, a ROM or a storage unit) in the apparatus in advance, but the embodiment is not limited thereto. For example, the program may be provided by being recorded in a computer-readable recording medium such as a CD-ROM, a flexible disk (FD), a CD-R, or a DVD (Digital Versatile Disk) in an installable or executable file format. Further, the storage medium is not limited to a medium separate from a computer or an embedded system and may be a storage medium that stores or temporarily stores a program downloaded through a local area network (LAN) or the Internet.

In addition, the program that is executed by each apparatus according to the embodiment and the modification examples may be provided by storing the program in a computer connected to a network such as the Internet and downloading the program through the network, or may be provided or distributed through a network such as the Internet.

What is claimed is:

1. A wireless tag reading apparatus comprising:
a first communication interface configured to communicate with a first external device through a first connection;
a second communication interface configured to communicate with a second external device through a second connection;
an antenna configured to emit a radio wave to read a wireless tag; and
a controller configured to:
identify either (a) the first communication interface as being in communication with the first external device or (b) the second communication interface as being in communication with the second external device;
change a power level of the radio wave emitted by the antenna based on which of the first communication interface or the second communication interface is identified; and
read the wireless tag by controlling the antenna to emit the radio wave with the changed power level,
wherein at least one of (a) the first external device and the second external device are different types of devices or (b) the first connection and the second connection are different types of connections.

2. The wireless tag reading apparatus of claim 1, wherein:
the first communication interface is configured to communicate with the first external device through a wired connection; and
the second communication interface is configured to communicate with the second external device through a wireless connection.

3. The wireless tag reading apparatus of claim 2, wherein the controller is configured to reduce the power level of the radio wave used for reading the wireless tag if the controller identifies the first communication interface as being in communication with the first external device through the wired connection.

4. The wireless tag reading apparatus of claim 2, wherein the controller is configured to increase the power level of the radio wave used for reading the wireless tag if the controller identifies the second communication interface as being in communication with the first external device through the wireless connection.

5. The wireless tag reading apparatus of claim 1, wherein the controller is configured to:
determine a first power level of the radio wave used for reading the wireless tag when the first communication interface is in communication with the first external device;
determine a second power level of the radio wave used for reading the wireless tag when the second communication interface is in communication with the second external device; and change between the first power level and the second power level based on which of the first communication interface or the second communication interface is identified.

6. The wireless tag reading apparatus of claim 1, wherein:
the first external device is a point of sale terminal; and
the second external device is a server.

7. A method comprising:
identifying a communication interface that is connected to an external device, the identified communication interface being one of a plurality of communication interfaces;
changing a power level of a radio wave used for reading a wireless tag based on which of the plurality of communication interfaces is identified; and
reading the wireless tag using the radio wave at the changed power level.

8. The method of claim 7, wherein the plurality of communication interfaces include a first communication interface that is configured to communicate through a wired connection and a second communication interface that is configured to communicate through a wireless connection.

9. The method of claim 8, wherein changing the power level of the radio wave used for reading the wireless tag based on which of the plurality of communication interfaces is identified includes:
reducing the power level of the radio wave used for reading the wireless tag if the identified communication interface is the first communication interface that is configured to communicate through the wired connection.

10. The method of claim 8, wherein changing the power level of the radio wave used for reading the wireless tag based on which of the plurality of communication interfaces is identified includes:
increasing the power level of the radio wave used for reading the wireless tag if the identified communication interface is the second communication interface that is configured to communicate through the wireless connection.

11. The method of claim 7, further comprising:
determining a first power level of the radio wave used for reading the wireless tag when a first communication interface of the plurality of communication interfaces is connected;
determine a second power level of the radio wave used for reading the wireless tag when a second communication interface of the plurality of communication interfaces is connected; and
changing between the first power level and the second power level based on which of the first communication interface or the second communication interface is identified.

12. The method of claim 7, wherein the plurality of communication interfaces include a first communication interface that is configured to communicate using a first communication method and a second communication interface that is configured to communicate using a second communication method different from the first communication method.

13. The method of claim 7, wherein the external device is one of a point of sale terminal or a server.

14. A wireless tag reading apparatus comprising:
a first communication interface configured to communicate with a first external device;
a second communication interface configured to communicate with a second external device;
an antenna configured to read a wireless tag within a reading area; and
a controller configured to:
identify either (a) the first communication interface as being in communication with the first external device or (b) the second communication interface as being in communication with the second external device;
change a range of the reading area based on which of the first communication interface or the second communication interface is identified; and
read the wireless tag within the reading area.

15. The wireless tag reading apparatus of claim 14, wherein:
the first communication interface is configured to communicate with the first external device through a wired connection; and
the second communication interface is configured to communicate with the second external device through a wireless connection.

16. The wireless tag reading apparatus of claim 15, wherein the controller is configured to reduce the range of the reading area if the controller identifies the first communication interface as being in communication with the first external device through the wired connection.

17. The wireless tag reading apparatus of claim 15, wherein the controller is configured to increase the range of the reading area if the controller identifies the second communication interface as being in communication with the first external device through the wireless connection.

18. The wireless tag reading apparatus of claim 14, wherein the controller is configured to:
determine a first range of the reading area for use when the first communication interface is in communication with the first external device;
determine a second range of the reading area for use when the second communication interface is in communication with the second external device; and
change between the first range and the second range based on which of the first communication interface or the second communication interface is identified.

19. The wireless tag reading apparatus of claim 14, wherein:
the first communication interface is configured to communicate with the first external device using a first communication method; and
the second communication interface is configured to communicate with the second external device using a second communication method different from the first communication method.

* * * * *